United States Patent [19]

Kanzelberger et al.

[11] Patent Number: 4,497,248
[45] Date of Patent: Feb. 5, 1985

[54] THERMAL ENGRAVING PRESSES

[75] Inventors: James C. Kanzelberger, Riverside, Ill.; William J. Deau, Manitowoc, Wis.

[73] Assignee: Contemporary Inc., Chicago, Ill.

[21] Appl. No.: 559,852

[22] Filed: Dec. 12, 1983

Related U.S. Application Data

[63] Continuation of Ser. No. 373,180, Jun. 29, 1982, abandoned, which is a Continuation of Ser. No. 297,758, Aug. 31, 1981, abandoned.

[51] Int. Cl.³ .............................................. B44B 5/00
[52] U.S. Cl. ...................................... 104/27; 101/31; 101/DIG. 4
[58] Field of Search ............ 101/41, 42, 316, 407 BP, 101/DIG. 4 X, 9, 27 X, 31 X

[56] References Cited

U.S. PATENT DOCUMENTS

| | | | |
|---|---|---|---|
| 1,572,494 | 2/1926 | Krause | 101/27 |
| 2,122,669 | 7/1938 | Wickwire | 101/407 BP |
| 2,356,951 | 8/1944 | Runtoz | 101/407 BP |
| 2,621,435 | 12/1952 | Weber | 101/27 |
| 3,589,279 | 6/1971 | Deutsch | 101/27 |
| 3,858,705 | 1/1975 | Reitano | 101/336 X |
| 4,029,010 | 6/1977 | Deisting | 101/407 BP X |

Primary Examiner—Edward M. Coven
Attorney, Agent, or Firm—Laff, Whitesel, Conte & Saret

[57] ABSTRACT

The invention relates to a thermal engraving press for hot stamping, especially—although not exclusively—a plastic material which simulates engraved metal. A hot die and a movable platen are horizontally displaced from each other to support a work piece in a position opposing the die. The position of the work piece may be adjusted in three dimensions relative to the die. The hot stamping foil also provides a guard which prevents the operator from accidently touching the hot die. A feature of the inventive press is that it has an extremely low cost and is practically foolproof.

13 Claims, 7 Drawing Figures

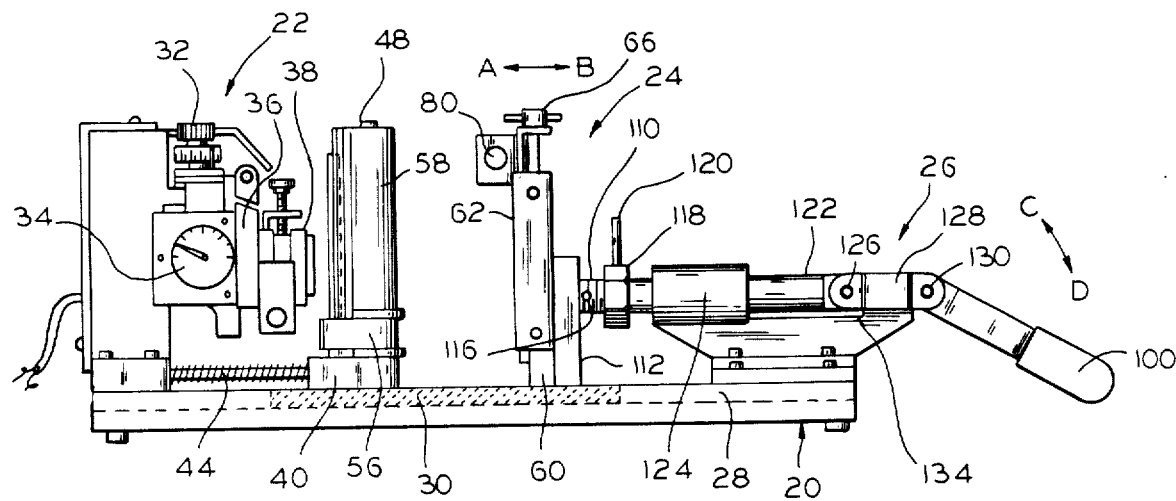
FIG.1
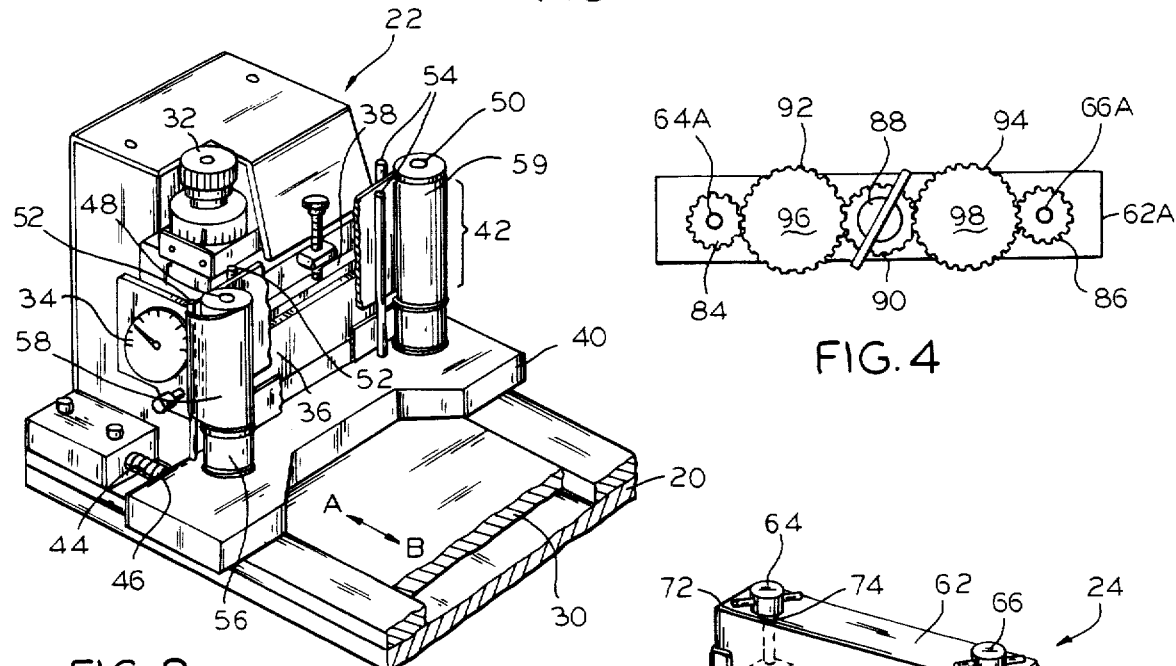
FIG.2
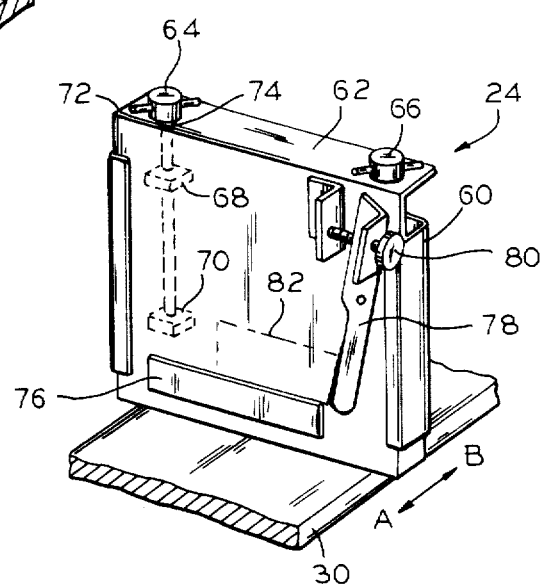
FIG.4
FIG.3

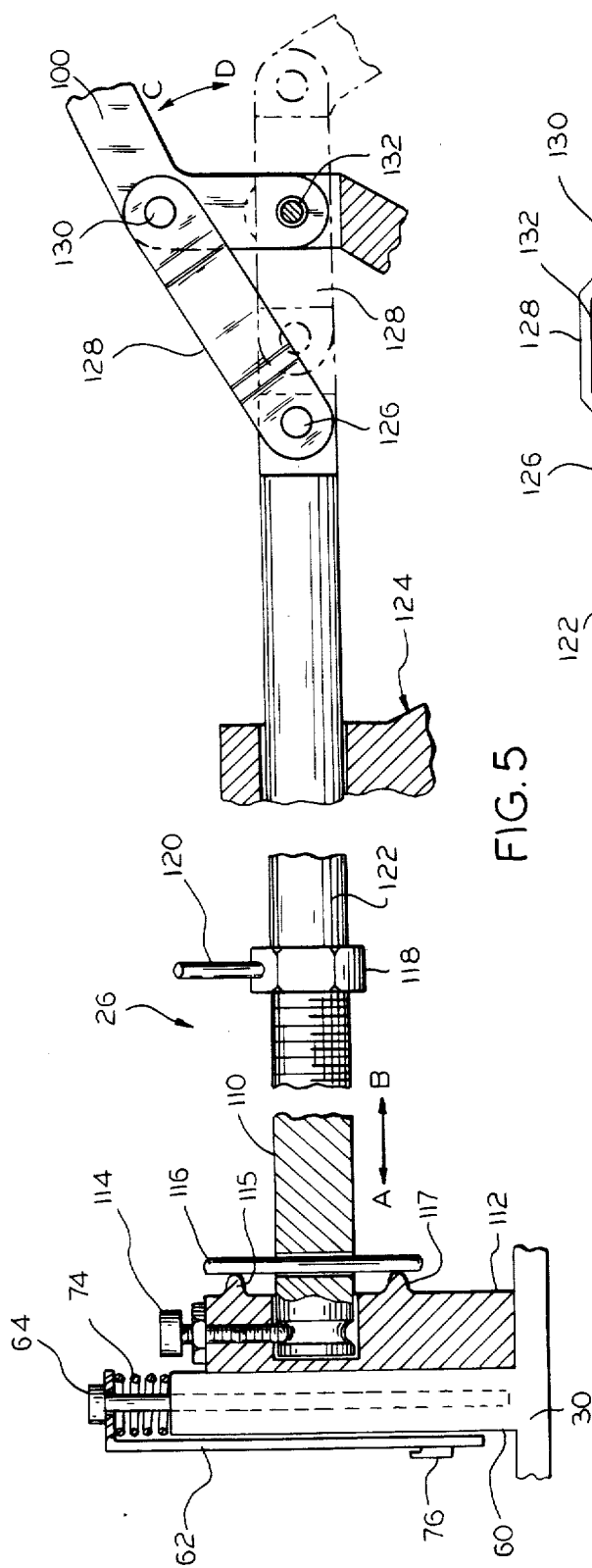
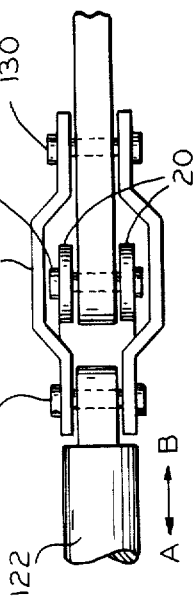
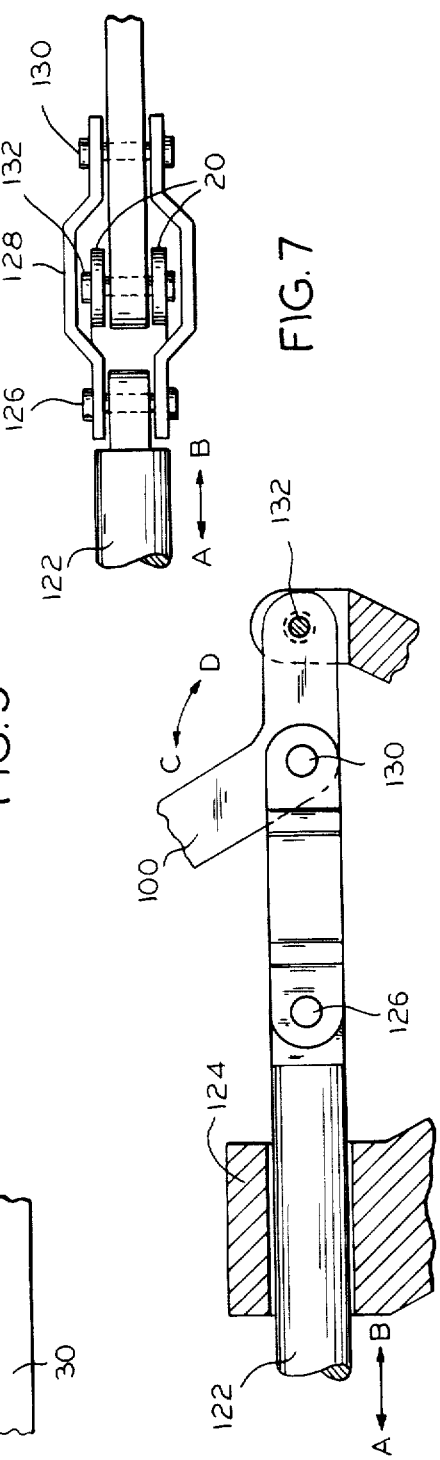
FIG. 5
FIG. 7
FIG. 6

THERMAL ENGRAVING PRESSES

This is a continuation of U.S. patent application Ser. No. 373,180, filed June 29, 1982, abandoned, which is a continuation of U.S. patent application Ser. No. 297,758, filed Aug. 31, 1981, now abandoned.

This invention relates to thermal engraving presses and more particularly to presses designed for safe use by persons who have no previous special training.

Hot stamping presses are well known machines, which are widely distributed and used. An exemplary installation of such a machine might be in the leather goods department of a large department store. A clerk selects, say, three metal type bars or slugs to form a customer's initials, and places them in the hot stamping machine where they are heated to a high temperature. A leather billfold, handbag, luggage tag, or the like, is placed in the machine with a piece of hot stamping foil between the type face and the leather surface. A platen is closed and the type face die and foil are pressed against the leather surface where the high temperature of the type face transfers ink from the foil to the leather.

A first problem with these hot stamping machines is that the average clerk, with no special training, may be expected to make many mistakes. Exemplary of these human error mistakes are type slugs which are not properly seated, positioned or clamped so that some type face is higher than other type face. Another problem with hot stamping machines is that the clerk must have a "feel" for how hard to press the type face against the stamped material. Too light a touch will not transfer the ink; too heavy a touch may ruin the stamped material. Other problems relate to non-aligned misplaced, or inverted letters, etc. Yet another problem is that the clerk may touch the heater and receive a severe burn, as when a type stick is being inserted into the machine, for example.

Therefore, in a field location, the conventional hot stamping machines are more or less limited to a use with no more than about three initials. While a store which sells a low volume of very expensive articles may be able to absorb the losses when the hot stamping is wrong or defective, most stores would rather not offer the service.

Recently developed plastic materials give an appearance of an engraved, brushed metal plate, as described in U.S. Pat. Nos. 4,125,655, issued Nov. 14, 1978; 4,047,996, issued Sept. 13, 1977; and 3,940,864, issued Mar. 2, 1976. Heretofore, this plastic material has been debossed in hot stamping presses, with great commercial success. Sometimes, many colors of hot stamping ink may be used to give a more elegant appearance which raises the debossed material to a quality level that is compatible with fine jewelry.

Heretofore, these simulated-metal, engraved plastic plates have been debossed in a factory because they are usually done in such a fine detail that a highly skilled operator is required. This skill level requirement adds both cost and time to the delivery of a finished product, especially for customized products.

One answer to the time required to deliver a customized product is to partially finish the product in a factory and then to personalize it in the field. Conventionally, this procedure leads to all of the hot stamping problems outlined above. Also, the field operator has the added problem of aligning her work with the partially completed factory product, and of having to use the same "touch" that was used in the factory. Therefore, even the best field operators often produced an end product wherein it is obvious that the factory and customizing stampings occurred in two steps.

Accordingly, an object of the invention is to provide new and improved thermal engraving presses and more particularly to providing machines which are practically fool proof, even when operated by persons having no special training.

Another object is to enable a debossment in the field of the above described simulated metal, plastic material. In particular, an object is to achieve this debossment with the same quality that is achieved in the factory. In this connection, an object is to enable a perfect alignment of the thermally engraved material, quickly and easily. Here, an object is to insure that all operators will always have the same "touch", regardless of the skill level or experience differences of the operators.

In keeping with these and other objects, the invention provides a thermal engraving press which has a horizontal platen travel, with the excursion being fixed by an adjustable linkage. The platen is floating so that a work piece supported on it may be adjusted in both horizontal and vertical directions in order to align the work piece relative to the location of hot type face which makes the debossment. The length of the platen travel stroke, and the position of the work piece on the platen may be easily adjusted by one with no special training to, say, 1/10000-th of an inch accuracy. Spools of hot stamping foil not only provide for the transfer of ink into the debossment, but also form a guard which prevents the operator from touching the hot type elements.

A preferred embodiment of the invention is seen in the attached drawing wherein:

FIG. 1 is a side elevation of the inventive thermal engraving press with the platen open;

FIG. 2 is a perspective view of the heater head and of the hot stamping foil, both of which are seen in FIG. 1;

FIG. 3 is a perspective view of a platen assembly also seen in FIG. 1;

FIG. 4 shows an alternative to the embodiment of FIG. 3 for making a vertical adjustment of the floating platen;

FIG. 5 shows the mechanism for adjusting the length of the platen excursion and for opening and closing the platen;

FIG. 6 shows the linkage of FIG. 5 in an extended (press closed) position; and

FIG. 7 is a top view of the same linkage in a platen opened position.

The side elevation view (FIG. 1) shows the inventive horizontal thermal engraving press having a base 20, a heating head 22, a platen 24, and a control toggle linkage 26. The base 20 is any suitable, fairly massive member having a longitudinal track 28 formed therein. A slide 30 (crosshatched in FIG. 1, for easy identification) is slidably positioned within track 28. The platen 24 is mounted on the slide 30 to approach the heating head 22 when the control toggle link 26 is extended in direction A and to back away from the heating head when the linkage is retracted in direction B.

The heating head 22 comprises a heating element which may be adjusted by means of a control knob 32 to provide any suitable temperature which is displayed on a scale 34. The preferred heat for the material disclosed in the above cited patents is 300° F. However, a range of temperature in the order of 150°–300° F. may be used, with 150° F. being preferred for leather. In essence, this heating head is approximately the same as the heating heads used by a hot stamping machine (one of which is furnished by the Howard Company).

On the front of the heating head 22 is a mandril 36 for receiving a replaceable type stick containing any convenient form of hot die 38 for embossing a work piece made of the inventive material shown in the above cited patents, or other material. Very often, a zinc die is used. For example, hand set type, a conventional linotype slug, a printer's logo, or any other convenient printing cut or die could be used. In any event, the die reaches a temperature selected by knob 32 and displayed on dial 34 (usually about 300° F. for the simulated-metal plastic material mentioned above).

Mounted on a platform 40 and in front of heater head 22, is a support for hot stamping foil 42. Fixed on the upper surface of platform 40 and in a spaced parallel relationship are a pair of upstanding spool receiving posts 48, 50, and foil guide posts 52, 54. The hot stamping foil 42 is wound on a supply spool mounted on post 48, threaded across guide posts 52, 54, and taken up on a take up spool mounted on post 50. Preferably, each of the spool posts 48, 50 has a spring (not shown) associated therewith to restrain the unwanted rotation of any hot foil spools mounted on the posts, so that the foil does not unwind aimlessly.

The platform 40 moves along a spaced parallel pair of guide pins (one of which is seen at 44). Each of the guide pins is surrounded by a coiled spring 46 for normally urging the platform 40 as far as it will go in direction B (i.e., to position the hot stamping foil away from and out of contact with the hot die 38). When the platen 24 is closed, it pushes platform 40 in the direction A and against the urging of the springs 46. The hot stamping foil 42 is thus moved into contact with the hot die while the front of the foil is in contact with a work piece.

The hot stamping foil 42 is any conventional material, which may be a "MYLAR" carrier for engaging the hot die 38 on one side and having ink on the other side. The MYLAR has good thermal insulating properties which does not spread the heat of the die. The ink is a material which transfers from the MYLAR carrier to another surface on a work piece, where it adheres and fuses under the heat of the hot stamping die.

Any suitable number of spools of hot stamping foil may be mounted on posts 48, 50 and used simultaneously at any given time. For example, as here shown, a first supply spool 56 of hot stamping foil is placed on the posts 48, pulled around the guide posts 52, 54, and taken up on a spool (not seen in FIG. 2). Then, a second spool 58 of hot stamping foil is next placed on the posts and taken up on spool 59. In this particular example, the foil on spool 56 may have silver ink and the foil on spool 58 may have black ink. Likewise, any suitable number of spools carrying foil of any suitable color combinations may be supplied. Thus, at a single stroke, the press might, for example, print a company name in black, its logo in blue, and its slogan in silver. U.S. Pat. No. 4,125,655 explains how colors may be overlaid to give enhanced appearances.

The upstanding posts 48, 50, 52, 54, hot stamping foil 42, and the spools carrying the foil, provide a barrier between the hot die 38 and the operator's hands. Thus, an element of safety is built into the press without adding the cost of a guard.

The details of the platen 24 are best seen in FIG. 3. A supporting platen 60 is fixed onto the top of slide 30, which together travel as a unit, along the longitudinal track 28. As the platen travels to the press closed position, it pushes platform 40 and positions the hot stamping foil between hot die 38 and the work piece.

Mounted on the front of supporting platen 60 is a floating platen 62 which moves a work piece both vertically and horizontally relative to the stationary die. In greater detail, a spaced parallel pair of feed screws 64, 66 are rotatably supported in vertical positions on opposite ends of the supporting platen 60. The exact manner of supporting the feed screws is not too important. As here shown, the supporting platen 60 has upper and lower nuts 68, 70 fixedly associated therewith, with the feed screw 64 passing through the nuts. The feed screws could also be received in holes which are drilled and tapped in the platen 60. In any event, the pitch of the threads on feed screws 64, 66 is selected according to the desired minimum vertical adjustment of the floating platen 62. For example, each controllable portion of a turn of a feed screw might raise or lower the floating platen by 1/10,000 of an inch.

The top of the floating platen 62 may fold over at 72 and have holes formed there to receive and abut against the tops of the feed screws 64, 66. A coiled spring 74 is positioned on each of the feed screws between the supporting platen 60 and the floating platen 62. These coiled springs 74 urge the floating platen upwardly against the tops of the feed screws and eliminate any backlash screw thread problems.

On the face of the floating platen 62 are horizontal and vertical guides 76, 78. The horizontal guide 76 moves up and down, or tips on either end, as the feed screws 64, 68 are turned. The vertical guide 78 moves back and forth as the screw 80 is turned. Thus, a work piece 82 may be set into the guides 76, 78 and then, both are horizontally and vertically positioned very precisely by rotation of the individual screws 64, 66, 80.

A proof card may be used as work piece 82, during initial set up. That proof card may have any suitable lines or grid of lines printed thereon to facilitate the adjustments. Once the platen is positioned and the printing is perfectly centered on the proof card, any suitable number of work pieces (plates of the simulated-metal plastic material described in the above listed patents) may be imprinted.

One of the objects of the invention is to provide the lowest cost machine so that it may be purchased by a relatively small shopkeeper, with low volume printing requirements. On the other hand, something may also be said for producing more expensive machines for the large volume producers whose costs may be reduced by saving time. For example, the invention described thus far contemplates a manual rotation of the spools 56, 58 carrying the hot stamping foil 42. The task of foil advancement is approximately the same as film advancement in a 35 mm single lens reflex camera, for example. Thus, the invention contemplates an addition at the tops of posts 48, 50 of a power winder similar to the automatic winders used on such cameras. Each time that the platen opens after debossment, the hot stamping foil is automatically advanced by such a power winder.

FIG. 4 shows another such convenience which reduces set up time. Here, each of the adjustment feed screws 64A, 66A, for the floating platen 62A has a gear 84, 86 individually associated with its upper end. In the center of the floating platen 62A, there is a turning knob 88, having a scale associated therewith so that an operator may directly dial a number corresponding to a reading taken from a proof card. Knob 88 controls a gear 90 which turns idler gears 92, 94, individually associated with each of the feed screws 64A, 66A gears 84, 86. The idler gears 92, 94 are held in place by threaded caps 96, 98, respectively. If a threaded cap 96 or 98 is removed, the idler gear 92 or 94 may be lifted out so that the associated feed screw gear may be turned individually to true the horizontal alignment of guide 76. Thus, if the horizontal guide 76 is tipped a skew, either one of the feed screws 64A, 66A may be turned until the guide is aligned. Then the idler gear and its threaded cap are replaced. Thereafter, the floating platen always remains horizontal as it moves up or down.

The control toggle linkage 26 for opening and closing the platen is seen in FIGS. 1 and 5-7. As a handle on the linkage is moved, the platen is pushed or pulled in the directions A or B to open or close the press. The linkage movement is controlled by swinging a control arm 100 in directions C or D, to close or open the platen, respectively.

Means are provided for adjusting the excursion stroke of the linkage 26, thereby providing the third of the three dimensional adjustments of the work piece position relative to the hot die. In greater detail, this excursion adjustment means includes a threaded jack screw 110 which terminates on its left-hand end (as seen in the drawing) in a capture groove (FIG. 5) which fits into a hole in a block 112 secured in any suitable manner to the back of the stationary platen 60. The capture groove is held in place by a set screw 114. Near the block 112, the threaded jack screw 110 has a hole with a pin 116 secured therein. The pin 116 provides a means for turning the threaded jack screw 110 to lengthen or shorten the linkage stroke and therefore the excursion of the platen. In some embodiments the back of block 112 has a circle of detents 115, 117 formed thereon. Each detent represents some discrete linear distance (such as 1/10,000 of an inch) which may be added to or subtracted from the excursion.

At the opposite end of the jack screw 110, a lock nut 118 may be loosened or tightened to enable or prevent a rotation of jack screw 110 in order to lengthen or shorten the platen stroke. The lock nut 118 is turned by a pin handle 120. Attached to the nut is a sliding bar 122 which is supported by a bearing 124, mounted on base plate 20 (FIG. 1).

At the right-hand end (as viewed in the drawings) of the sliding bar 122, is a pivoting link 128 which swings around the pin 126. The other end of link 128 is pinned at 130 to a center point of an "L-shaped" handle 100. The short end of the "L" is pivotally connected to a ground point 132 on the base plate 20. The long end of the "L" is a manually operated handle which may swing in the directions "C, D".

In operation, the handle 100 is shown all the way down in direction D by solid lines in FIGS. 1 and 7 and by dashed lines in FIG. 5. At this point, the slide bar 112 is pulled as far as it will go in direction B. The platens 60, 62 are standing in their fully open position, seen in FIG. 1. The die 38 is in position and heated to, perhaps, 300° F., as selected by dial 32 and indicated by a thermometer 34.

The floating platen 62 is adjusted both vertically at 64, 66 (FIG. 3) and horizontally at 80 to center the work piece 82 relative to the hot die 38. The length of the platen excursion stroke is adjusted by using locking pin 120 (FIG. 5) as a handle to loosen the lock nut 118, after which the threaded jack screw 110 is rotated by the pin 116 to select and insure a correct debossment depth. If the work piece always has the same or a predictable one of several thicknesses, the detents 115, 117 may be suitably marked to enable the operator to move directly to the proper stroke. Then, the locking pin handle 120 is used to turn nut 118 and lock the thread jack screw 110 in place.

The stroke adjustment is important when the work piece is the simulated-metal plastic of the above cited patents. This is because the engraved look is greatly enhanced when the depth of the die is precisely controlled.

The spools 56, 58, 59 of hot stamping foil are rotated until an unused portion of foil is positioned between the hot die 38 and the work piece 82 mounted on the floating platen 62. Then, the handle 100 is moved in the direction C from the dashed line through the solid line positions, as seen in FIG. 5. Continuing in the direction C, the handle 100 is moved as far as it will go, as seen in FIG. 6, where the handle 100 is stopped when it strikes a surface 134 (FIG. 1).

At this time, the work piece 82 is pushed against the hot die 38 and the ink on foil 42 is transferred into and fused on the bottom of the debossment. There has been a three dimensional positioning of the work piece relative to the hot die since the length of the stroke has been set and locked by nut 118 (FIG. 5). The work piece has been centered by adjustments of feed screws 64, 66, 80 (FIG. 3). The foil 42 and various guide posts protect the operator's hands from the hot die. The only "skill" required of the operator is to position work piece 82 against the guides 76, 78 and to move the handle 100 until it bottoms on the surface 134. Then the handle 100 is swung in the direction D until it reaches the dashed line position of FIG. 5. The work piece 82 is then removed, and, if desired, a new work piece is emplaced and the process is repeated.

Those who are skilled in the art will readily perceive how to modify the invention. Therefore, the appended claims are to be construed to cover all equivalent structures which fall within the true scope and spirit of the invention.

We claim:

1. A thermal engraving press comprising a stationary frame, heater means supported at a fixed location on said frame, a hot die heated by said heater means at a fixed location also on said frame, platen means mounted on said frame for horizontal displacement along said frame toward or away from said fixed locations of said hot die and heater means, means for precisely adjusting the length of a non-yielding horizontal excursion of said platen along said frame, said platen supporting a work piece in a vertical position opposing said die which is easily visible when said platen is in an open position away from said hot die, precision adjustment means associated with said platen for two dimensionally adjusting the position of said work piece relative to said die in a substantially vertical plane on said platen, means for horizontally moving said platen means over said excursion along said frame toward and away from said die, the completion of the displacement of said platen over the non-yielding excursion pressing said work piece to a closed position against said hot die at the fixed location on said frame, said excursion preserving the precise adjustment of said non-yielding horizontal displacement along the entire length thereof and especially at the closed position where said platen means confronts and presses the work piece against the die at the end of said excursion along said frame, whereby the position of said work piece may be precisely adjusted in three dimensions relative to said die.

2. The press of claim 1 and means for supporting hot stamping foil at a position which is between the die and the work piece.

3. The press of claim 1 and means for supporting hot stamping foil having at least two colors of ink at positions which are between the die and the work piece.

4. The press of claim 2 or 3 wherein said hot stamping foil is mounted on a moving platform which is spring biased to move to a normal position which is displaced away from said hot die, and means responsive to the excursion of said platen for moving said platform to a position for transferring ink from said foil to said work piece under the heat of said die.

5. The press of claim 1 wherein said platen means comprises a supporting platen having a vertically floating platen mounted thereon, and wherein said precision adjustment means includes a pair of spaced parallel feed screws mounted on said supporting platen for independently adjusting the positions of opposite ends of said floating platen within said vertical plane.

6. The press of claim 5 and means for individually adjusting the parallel feed screws.

7. The press of claim 5 and means for simultaneously adjusting both of the parallel feed screws.

8. The press of claim 1 wherein said means for moving said platen comprises link means including a threaded screw, means for rotating said threaded screw to adjust the length of said link and means for locking said threaded screw in said adjusted position.

9. A horizontal press comprising a base having a horizontal guideway formed longitudinally thereon, means for heating and supporting a die at a fixed and unmovable position near one end of said guideway, slide means having an excursion length adjustment means, said slide means being mounted on said guideway to move with a controllably fixed stroke between an open position at one end of the controllably fixed stroke which is away from said heated die and a precisely closed position at the other end of the controllably fixed stroke which is adjacent said fixed die, platen means supported on said slide means for holding a work piece in a position opposed to said heated die, means for three dimensionally adjusting the position of said work piece relative to said die when said slide means is at the closed position end of said fixed stroke, said excursion adjustment means comprising a shaft threaded into a tube for controllably making said fixed stroke adjustment to complete one dimension of said three dimensional adjustments responsive to a turning of said shaft relative to said tube, whereby said adjustment of the other end position of said fixed stroke occurs by the lengthening or shortening of said shaft and tube as said shaft advances or returns on said threads responsive to said turning thereof, and means for positioning hot stamping foil between said heated die and said work piece when said slide means is in said closed position.

10. The press of claim 9 wherein said platen means comprises a supporting platen having a vertically floating platen with a guide mounted thereon, a pair of feed screws on said supporting platen for adjusting the position of said floating platen in one of said three dimensions, and a third feed screw associated with said floating platen for adjusting said guide on said floating platen in a second adjustment of said three dimensions.

11. The press of claim 10 and a control toggle linkage for moving said slide over an excursion between said open and closed positions, and means for adjusting said excursion thereby completing a third adjustment of said three dimensions.

12. The press of claim 11 wherein said toggle linkage includes a threaded jack screw, a pivoting link for sliding said jack screw and a manually controlled handle for sliding said jack screw.

13. The press of any one of the claims 9–12 and a platform movable along a path parallel to said guideway, a plurality of upstanding posts on said platform for supporting said hot stamping foil, and means for moving said platform responsive to movement of said slide means.

* * * * *